United States Patent [19]

David

[11] Patent Number: 4,617,697

[45] Date of Patent: Oct. 21, 1986

[54] MOLDABLE HANDLE ADAPTER

[76] Inventor: Constant V. David, 4952 Field St., San Diego, Calif. 92110

[21] Appl. No.: 761,352

[22] Filed: Aug. 1, 1985

[51] Int. Cl.⁴ .................... A63B 49/00; A63B 53/14; B25G 1/10
[52] U.S. Cl. .............................. 16/110 R; 16/111 R; 16/DIG. 12; 16/DIG. 18; 16/DIG. 19; 264/271.1; 264/279.1; 273/75; 273/81 R
[58] Field of Search ............. 16/110 R, 111 R, 116 R, 16/DIG. 12, DIG. 18, DIG. 19; 273/75, 81 R-81 D; 264/271.1, 279.1, 249, 263; 523/211

[56] References Cited

FOREIGN PATENT DOCUMENTS 2746168 4/1979 Fed. Rep. of Germany ........ 273/75

Primary Examiner—James M. Meister

[57] ABSTRACT

A handle adapter for hand molding around an existing handle and constructed in a manner enabling the user to shape the external surface of the adapter to conform to the grip of the user's hand. The material to be molded is contained in a pouch having flexible walls and end closures. The size of the pouch is such that the total volume which it could contain is much larger than the volume of the moldable material therein. One half of the pouch has a cross-sectional area smaller than the cross-sectional area of the other half, whereby the smaller cross-section half of the pouch can be pushed inside the larger cross-section half of the pouch and the material therebetween becomes trapped between two concentrically positioned flexible walls. When the walls of the smaller half pouch are supported by a solid structure, the moldable material then envelops such structure. When pressure is applied externally preferentially at certain locations on the walls of the larger half pouch, the trapped moldable material has no way to escape and is forced to rearrange its shape to match the external contour imposed on the outer wall on which such pressure is being applied. The moldable material is then caused to harden while the pressure remains applied. This results in obtaining a molded external surface which thus matches the configuration of the means by which the pressure was externally applied.

8 Claims, 9 Drawing Figures

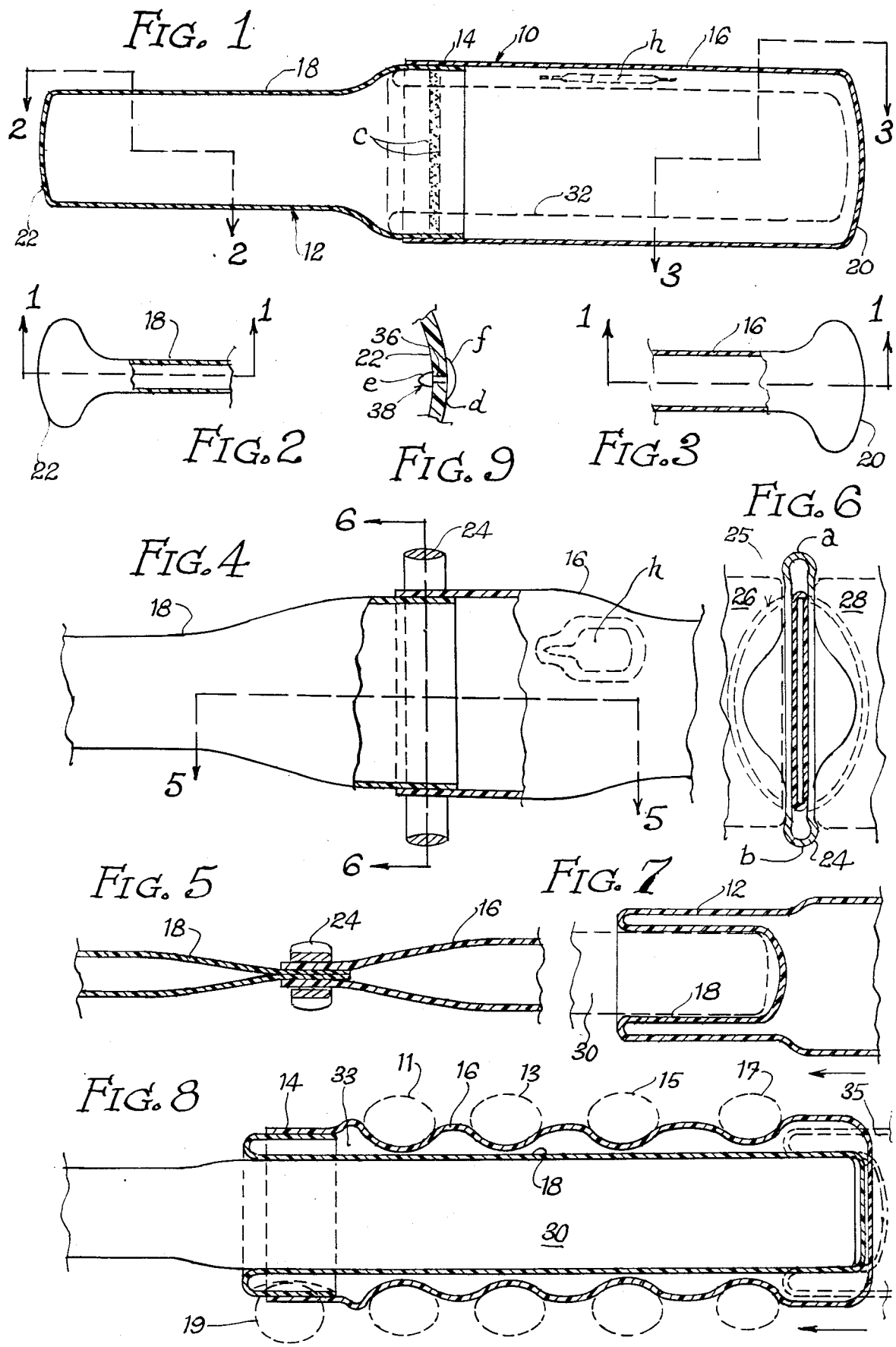

MOLDABLE HANDLE ADAPTER

BACKGROUND OF THE INVENTION

The present invention relates to an adapter for installation around an existing handle in a manner such that the user of the handle can mold the outer portion of a handle so equipped to fit his (her) grip. The handling of the item provided with such handle is thereby greatly facilitated and rendered much firmer and more precise. This is done by enabling the user to cause the external contour of the adapter to conform to his (her) grip and to maintain such conforming shape.

As a typical example of a class of items which could benefit from the application of the present invention are those items requiring a firm and exact grip and onto which externally and randomly applied loads are the result of their very use. Cases in point are a golf driving club and a tennis racket. In both cases, the item must hit an object correctly and hitting the object causes forces to be applied on the item, forces which in most instances are negatively disturbing. Such forces generate torques on the item handle, torques that the user must counteract and which necessitates a firm grip on the handle.

Attempts have been made in the past for providing such grip enhancers such as wrapping leather straps around the handle, having a mold made of the user grip for later shaping the handle and coating the handle external surface with materials offering good friction qualities. Having a mold made of one's hand grip is expensive. Means for increasing friction do not provide the handling precision expected and needed from the grip.

Thus a new inexpensive and effective way to adapt a specially and personally molded "handle-grip" to an existing handle is needed. The goal of the present invention is to provide such a way, in a manner such that the user alone can equip the handles of his favorite items.

SUMMARY OF THE INVENTION

It is therefore a primary object of the present invention to provide a moldable adapter that can be easily and securely installed on an existing handle.

It is another object of the present invention to provide a moldable adapter that fits the shape of the natural grip of a hand when it performs the act of firmly gripping.

It is still another object of the present invention to provide a moldable adapter that can be made to fit the user's grip in more than one way to hold the handle during the use thereof.

It is still another object of the present invention to provide a moldable adapter that has an external surface which can be selected to fit the touch characteristics most pleasant and most effective for the user.

Accordingly, the present invention provides a moldable adapter for handles that is easy to install, simple and inexpensive, and which offers selections of moldable materials and/or cover materials deemed most suitable for giving to the user the "feel" and the "touch" which are most desirable to him (her).

DESCRIPTION OF THE DRAWINGS

FIG. 1 is a plan longitudinal sectional view of two assembled halves of the pouch.

FIG. 2 is a partial elevation view of the end of the smaller half pouch.

FIG. 3 is a partial elevation view of the end of the larger half pouch.

FIG. 4 is a partial plan sectional view of the joint between the halves of the pouch and of the clamp thereon.

FIG. 5 is a partial elevation sectional view of the joint between the halves of the pouch and of the clamp thereon.

FIG. 6 is a cross-sectional view of the joint between the two halves of the pouch and of the clamp thereon.

FIG. 7 is a partial longitudinal sectional view of the pouch shown partially installed on a handle.

FIG. 8 is a longitudinal sectional view of the adapter on the handle and being molded by the user's fingers.

FIG. 9 is a partial view of the wall of one end closure of the pouch showing the sealing means of the aperture used for access to the internal volume of the pouch.

DETAILED DESCRIPTION OF THE INVENTION

Referring to FIGS. 1 to 6, the adapter, in its moldable form consists of a larger half pouch 10 joined to another smaller half pouch 12 by lap joint 14 formed by the overlapping of walls 16 and 18. The two half pouches are closed by end closures 20 and 22 specially shaped so as to facilitate the swelling of the half pouches as needed to accommodate the increases in their internal volumes caused by the introduction of the handle therein.

The pouch is filled with a moldable paste-like fluid, which is not shown for the sake of simplicity, occupying a volume considerably smaller then that which the pouch could contain if totally inflated. As an example, it is asumed, in the case of FIGS. 4 to 6, that the fluid consists of two parts which, when brought into intimate contact, react to form a mixture which rapidly hardens. For that reason, in their moldable state, the contents of the two half pouches must be separated and kept isolated until application is shortly forthcoming. FIGS. 4 to 6 depict a clamp configuration applied onto the half pouch lap joint 14. Clamp 24, shown in a deformed clamping shape, applies pressure on lap joint 14, thus preventing contact between the contents of the two half pouches. The original shape of clamp 24 is shown in phantom lines 25 in FIG. 6, before the jaws 26 and 28 of a crimping tool, not shown, were used to effect the clamping.

Referring to FIG. 7, the smaller pouch wall 18 is shown being wrapped against a handle core 30, assuming that clamp 24 has beem removed and that mixing the contents of the two half pouches has already been achieved. When the handle core becomes fully wrapped inside the sheath formed by walls 16 and 18, as shown by phantom line 32 of FIG. 1 (molded adapter), the moldable content of the sheath is ready to be molded into the wanted shape.

The molding operation is represented in FIG. 8 in which handle core 30 is shown enveloped by the sheath with an internal volume 33 filled with the moldable material. While the material is still in its plastic stage, pressure is then applied by fingers 11, 13, 15, 17 and thumb 19 of a hand (not shown) onto wall 16. The pressure then developed in volume 33 causes wall 16 to bulge slightly within the boundary constraints formed by the hand and the slight deformations of wall 16, and is transmitted to wall 18 supported by the external surface of handle core 30, thereby insuring a firm contact later between the molded adapter and the handle core. The construction of the pouch is such that lap joint 14 remains on the external wall of the molded adapter, thereby avoiding the necessity of a very flexible lap joint. For reference, contour 35 shown in phantom lines indicates how the moldable adapter is first engaged.

Depending upon the method used for filling the pouch with its contents, either one or two end closures are equipped with a filling orifice 36 located on the end closure (see FIG. 9). This orifice (or aperture) is sealed by specially shaped plug 38 which becomes firmly held once inserted in the aperture.

DISCUSSION AND OPERATION

The handle adapter just described can be constructed to be installed on a vast range of items and tools which need handling in a precise and firm manner. Also it can be constructed to accommodate handles that must be held with one hand or two hands. Furthermore, in some applications, the handle may be held in one hand only, but differently according to the type of function to be served. As an example, a tennis racket may be held in at least three basic ways. Each way requires a different holding of the racket. A golf driving club must be held with two hands, placed in one specific manner relatively to one another. Numerous other applications could also be enumerated and discussed, however the application scope of the present invention is too wide to even attempt it. The content of the following discussion, therefore, should not be construed as a limitation of such scope.

The three basic components of the adapter are the pouch, the material contained therein and the clamp. Each component is discussed separately below.

THE COMPOSITION MATERIAL

When molded, the material becomes one monolithic homogeneous hard body. The transition from moldable material to molded material must be made possible only once, at any time chosen by the user, be irreversible and achievable in a period of minutes. Also, the transformation of moldable to molded must be permanent and not influenced by time. The transformation, triggerred at will by the user, must only require a simple operation by the user. Because the molding must necessarily be accomplished by hand, the use of temperature as the transformation triggering agent is not practical. A chemical reaction between two base constituents is favored, but should not be construed as a limitation. Two types of chemical reactions are used as typical and non-limitative examples. One requires the use of a clamp, the other may not.

A well-known chemical reaction which does not require the use of a clamp to prevent the two parts of the chemical composition from coming into contact prematurely is that of water with plaster of Paris. The pouch contains a set amount of plaster of Paris powder and reinforcing fibers (glass fibers for instance) and is evacuated. The pouch can be pierced with the needle of a syringe containing a set amount of water when the user decides to mold the adapter around the already prepared handle core, at which time, the water is injected into the pouch for mixing with the pouch content. The user can then manipulate the pouch wall so as to throughly cause the plaster of Paris, the fibers and the water to form a paste that will harden in a few minutes. During these few minuts, the user then causes the smaller half of the pouch to roll over the handle core and then the larger half of the pouch to slide over the wall of the smaller pouch, while the material is still fluid. When the user senses the start of the hardening process by touch and finger pressure, he then forms the type of grip he selects and maintains that grip. As the user maintains his (her) grip, the hardening material assumes the shape imposed onto the pouch wall by the gripping hand. After a few more minutes, the plaster has set and the grip may be released. The molding of the adapter is completed, it has passed from the moldable stage to the in-place molded stage.

Another typical way to form a hard body in-place by hand molding is to cause two parts of a resin composition to become intimately mixed within a closed flexible-walled container. Such a composition is used as a typical and non-limitative example for the present invention construction in the case where a clamp is required to prevent premature contact between the two parts. The nature of the composition is unimportant and the two parts are referred to as Part A and Part B. In such construction, Part A may be contained in the smaller half pouch and Part B may be contained in the larger half pouch. The end closures of both half pouch are equipped with an aperture. After the the two half pouches have been assembled and the lap joint sealed, the clamp is placed on the joint. Each part of the composition is then injected in its respective half pouch, while being kept evacuated. After the correct amounts of Part A and/or Part B have thus been injected, plugs 38 are set in place to seal the half pouches. The moldable adapter is ready for storage until use is needed.

When a user decides to mold the adapter around an already prepared handle core, he (she) loosens the clamp and removes it. Squeezing alternatively each half pouch and forcing the content therein to flow into the other half pouch and pursuing such manipulation for a fraction of a minute results in a thorough mixing of the two parts. At that time, the operation of inserting the handle core into the pouch may be started and then completed in a short time, before the composition has appreciably hardened.

The user can then apply and maintain his selected grip type on the adapter external wall in the manner above-indicated. Chemical compositions such as some epoxy resins harden sufficiently in a few minutes, enough time to give the adapter its molded shape. To prevent this shape from changing noticeably during the period of time required for the completion of the resin curing, care is taken to rest the handle in a position such that any subsequent deformation of the molded resin is minimized and remains localized in a portion of the adapter which is least critical.

THE CLAMP

The clamp function is to keep both parts of a two-part composition segregated until such time when they must be mixed. The nature of the material used in the construction of the pouch walls is such that it is pliable, flexible, remains so with time and does not stretch much. The pressure applied onto the joint by the clamp needs only be small, not too localized but well distributed along the joint fold so as to effectively seal the passage between the two half pouches. When in place, the clamp must be easily removable with a minimum amount of effort and without risk of causing damage to the pouch walls. This can be achieved as is well known in the art by creating a weak point in a highly stressed part of the clamp, such as points a and/or b shown in FIG. 6 as examples.

The need for a clamp can be altogether eliminated with the use of a pressure-sensitive sealing seam located on the internal surface of wall 18 of the smaller half pouch. The location and extent of such a sealing seam are depicted by phantom lines c of FIG. 1. Such a seam seal consists of a narrow band coated onto the internal surface of wall 18, as shown, with a pressure sensitive adhesive as is well known in the art. The sealing occurs when the joint between the two half pouches is formed by flattening the already positioned open ends of the half pouches in the manner described for crimping the clamp in place. The internal seal thus created is much weaker than the much wider seal joining the two half pouches. When the content of one half pouch is forced by hand-applied pressure to push onto the internal seal, the seal ruptures and opens the passage between the two halves. If hand pressure is applied first on the smaller half pouch, the risk of damaging the joint seal is eliminated altogether. In such a construction, the clamp is not needed and the user's task is substantially simplified and rendered very easy.

THE POUCH

The nature of the materials used to fabricate the walls of the two half pouches need not be the same. As a matter of fact, each wall has its own set of requirements when the adapter is used in the molded stage. The external surface of wall 18 should adhere well to the handle core external surface. The external surface of wall 16 should offer good friction between the adapter and the user's hand. The external surface of wall 18 and the internal surface of wall 16 must form a strong lap joint when brought in contact to construct the adhesion sealing joint. An adhesive compatible with the materials of the walls can be used as is well known in the art. Heat-induced welding by means of localized fusing of compatible materials can also be used. Thus, the construction of the lap joint is achievable in ways that do not impose undue constraints on the selection of materials for the pouch walls.

These walls are in direct contact with at least one part of the composition material. Long storage life must be possible prior to use. The number of compatible combinations of composition materials and of wall materials is large as is well known in the art. The last and most important requirement imposed on the choice of wall material is that of providing a good "feel" to touch and good friction with hand skin, even while sweating. A suede-type of finish is possible with some plastic. The external surface of wall 16 can also be spray-coated with a finish coating that incorporates pieces of natural fibers which could provide friction, the right "feel" and also minimize the sweat problem. The wall materials must also be impervious to and serve as a barrier to gases and/or vapors that may be generated by the composition parts, before they are mixed. In all instances, the internal cavities formed by the half pouches must not contain trapped air and sould be evacuated. In the construction where plaster of Paris and an internal seam seal are used, water can be stored in one of the two pouches. Although voids necessarily exist between dust particles and/or fibers, such void volumes could also be evacuated.

The closing and sealing of the end closure apertures can easily be performed by providing an adequate flexible seal such as shown by d of FIG. 9, to maintain the vacuum. The insertion of sealing plug 38 can be facilitated by shaping its gland e as is represented in FIG. 9, plug 38 being also referred to as sealing cap. Once the sealing capped plug 38 is set permanently in place, any pressure exerted by the fluid inside the elongated container during the kneading action of walls 16 and 18, pushes gland e against the internal edge of orifice 36, thereby providing the sealing action needed for preventing any fluid leakage. Conversely, air is preventing from being sucked in by seal d formed by lip f of the cap. If plug 38 is installed by the user, upon filling the pouch, a protective peel-off guard (not shown) may be removed, exposing a pressure sensitive adhesive, located either on the internal face of the cap or around the orifice edge on the external surface of the end closure. Setting the capped plug in place then automatically creates a bond and the seal.

ALTERNATE EMBODIMENTS OF THE INVENTION

When a chemical composition consists of two parts, the relative amount of each part may vastly differ. In such an instance, the amount of the least voluminous part (usually a small percentage of the volume of the other part) is called and acts as a catalyst for a chemical reaction that takes place within the fluid of the most voluminous part. A potentially possible reaction is thus triggered and proceeds on its own henceforth once triggered. Such chemical reaction is best known as molecule cross-linking. It can happen typically with some types of plastic resins and silicone rubbers. Because the amount of catalyst is so small, but so powerful, it must absolutely be kept from contacting the other fluid and still be immersed in the fluid to be catalyzed, in the case of the present invention. This can be done by encapsulating the catalyst in a liquid form in a small container having thin flexible walls impervious to both the liquid catalyst and its vapor. The capsule is then placed inside the elongated pouch as depicted in FIGS. 1 and 4 by phantom lines h. When hardening of the fluid is desired, the catalyst capsule can be squeezed between two fingers through wall 16 (or 18) and caused to rupture, thusly injecting the catalyst into the fluid. At that time, the kneading operation of the pouch walls needed to cause a good mixing of fluid and catalyst can be performed. The shearing forces within the viscous flow of the fluid back and forth in the elongated pouch provide the mixing action required.

Both plastic resin and silicone rubber materials can be used in both embodiments: (1) when the two parts are of substantially equal volumes (reaction between two chemicals), and (2) when a cross-linking reaction is triggered by the use of a catalyst. In both cases, the fluid(s) which compose the bulks of the adapter body material can be inserted by the user immediately prior to their mixing, through one single orifice such as 36. This can be best performed with the use of two squeezable tubes provided with the elongated container equipped with its removable capping plug. The tubes each have a pointed discharge spout which can easily be inserted in the orifice. Each contains one of the two complementary parts of the fluid. The need for a clamp or for a sealing seam is eliminated. If a catalyst is used, the catalyst capsule can be located any place inside the pouch, and the fluid can then be added by the user in the manner above described. The sealing plug can then be permanently installed. The user ruptures the capsule and then mixes fluid and catalyst. The use of squeezable tubes for storage of the fluid prior to use improves the shelf life of the fluid and increases greatly the number of types and selections of materials then usable for walls 16 and 18.

The above-described embodiment also simplifies the construction of the elongated container. Lap joint 14 can be located near one end closure. Depending upon whether it is preferable or not to keep the lap joint exposed after installation of the adapter, the slip joint can be located closer to end closure 22 or 20. As selected, the lips of the end closure and the lips of the elongated pouch can also be joined together to form a lap joint. But the choice of construction of such end closure can best be left up to the manufacture to best satisfy the requirements of each specific application contemplated for the adapter.

In the case of all embodiments, the handle core must be prepared to receive the adapter. Such a preparation is left to the user to perform. In all instances, the molded adaptor must provide a positive and permanent locking of the adapter in place. In its moldable stage, the adapter is quite deformable and can conform to varied shapes and sizes, within limits. According to guiding directions, it is up to the user to chose and adopt the combinations of shape, size and degree of finish he thinks best. It is even possible for him to shape the handle core in a manner such that the molded adapter becomes removable and adaptable to other handles. A flexibility of adaptation of the molded adapter to various item handles by a user can easily be provided by the present invention.

As earlier explained, the invention refers to either a moldable or a molded adapter. The invention pertains to the same configuration, but at two different stages of its construction. The moldable configuration has no permanent shape, the content of the elongated container or pouch is in the form of a viscous fluid, even when the mixing of the parts has taken place, at least for a short time. After the moldable configuration is installed on the handle core, it is still in its moldable stage for a short while, long enough to enable the user to select and form his grip (or his two or three basic types of grips, as the case may be). The user must then maintain the grip until the adapter gives a feel of hardness, the "plastic" feeling earlier felt is then gone and it would be difficult to modify substantially the form then given to the adapter. The adapter has then acquired its molded configuration which has become permanent. The two terms apply to the invention equally well. In the cases where plastic resins or silicone rubbers are used, the adapter remains moldable after a substantial amount of curing has taken place. The adapter becomes molded before most of the curing process is completed.

Regardless of the nature of the chemical composition used in the adapter, the installation of the pouch around the handle core proceeds in the same manner as earlier described. It is better to perform the installation as soon as the fluid mixing is finished and before appreciable thickening occurs, so as to facilitate the sliding of th outer wall along the inner wall. For some compositions, the use of limited heat can lower the viscosity of the fluid for a short while and be very helpful. However, heat accelerates the curing process and reduces the amount of time available to the user for forming the adapter. Conversely, cooling the composition slows down the curing process and increases the viscosity of the fluid, thereby providing more time for the forming operation. A specified stage of the hardening, after which altering the adapter shape becomes impractical and the material will not change its form, is defined for each composition and corresponds to the degree of local deformation that locally exerted pressure can cause (touch feeling). When such a specified stage is reached, the equipped handle can be placed in a vertical position so as to minimize the effects of any residual creeping of the material.

It is thought that the apparatus and the method of the present invention will be understood from the forgoing description and it will be apparent that various changes may be made in the form, construction and arrangement of the parts thereof without departing from the spirit and scope of the invention.

Having thus described my invention, I now claim:

1. In combination,
   a handle; and
   an adapter surrounding a portion of the handle and configured to fit a user's grip, including a pair of elongate pouches each having a flexible deformable wall defining a closed end and an open end, means for joining the open ends of the pouches in overlapping relationship, one of the pouches being folded inside the other one of the pouches, the inside pouch being in intimate contact with the handle portion and there being defined an internal volume between the walls of the pouches which surrounds the handle portion, the volume being filled with a material which was initially moldable by gripping the outside pouch and which thereafter hardened to provide the adapter with a plurality of deformations for receiving the fingers and thumb of the user's hand.

2. The combination of claim 1 wherein the moldable material includes plaster.

3. The combination of claim 1 wherein the moldable material includes resin.

4. The combination of claim 1 wherein the moldable material includes silicone rubber.

5. The combination of claim 1 wherein the pouches are dimensioned relative to the handle so that the overlapping portions of the pouches and the joining means are not folded.

6. The combination of claim 1 and further comprising an internal sealing seam located substantially tranversally with respect to the pouch longitudinal axes normally separating the interiors of the pouches and which has been ruptured to permit mixing of a reacting pair of components of the material.

7. The combination of claim 1 and further comprising a capsule inside one of the pouches and normally containing a catalyst, the capsule having been ruptured to permit mixing of the catalyst with the material in the internal volume separating the pouches.

8. The combination of claim 1 and further comprising an external clamp normally located between the pouches about the overlap joint and which has been removed to permit mixing of a reacting pair of components of the material.

* * * * *